(12) United States Patent
Gebauer et al.

(10) Patent No.: US 7,457,716 B2
(45) Date of Patent: Nov. 25, 2008

(54) CONTROL MODULE ARRANGEMENT AND COMPRESSED AIR MAINTENANCE UNIT

(75) Inventors: Gunter Gebauer, Esslingen (DE); Jens Garner, Stuttgart (DE); Klaus Kleinrad, Kongen (DE)

(73) Assignee: Festo AG & Co., Esslingen (DE)

( * ) Notice: Subject to any disclaimer, the term of this patent is extended or adjusted under 35 U.S.C. 154(b) by 520 days.

(21) Appl. No.: 11/104,335

(22) Filed: Apr. 12, 2005

(65) Prior Publication Data

US 2005/0240807 A1    Oct. 27, 2005

(30) Foreign Application Priority Data

Apr. 13, 2004   (DE)   ........................ 10 2004 017 894

(51) Int. Cl.
*G01L 25/00* (2006.01)
*G06F 11/30* (2006.01)
*G21C 17/00* (2006.01)

(52) U.S. Cl. ........................ 702/114; 702/183

(58) Field of Classification Search ................. 702/113, 702/114, 182–185
See application file for complete search history.

(56) References Cited

U.S. PATENT DOCUMENTS 5,835,372 A * 11/1998 Roys et al. .................. 702/105

7,272,533 B2 * 9/2007 Schlosser .................... 702/184
2003/0125841 A1   7/2003 Schlosser .................... 700/282
2004/0051381 A1   3/2004 Garner et al. ................. 307/11

FOREIGN PATENT DOCUMENTS

| DE | 102 58 873 A1 | 7/2003 |
| EP | 1 400 702 A2  | 3/2004 |
| EP | 1 586 780     | * 10/2005 |
| WO | 94/04831      | * 3/1994 |

* cited by examiner

*Primary Examiner*—Michael P Nghiem
(74) *Attorney, Agent, or Firm*—Hoffmann & Baron, LLP

(57) ABSTRACT

A control module arrangement for a compressed air maintenance unit constructed like a battery and a compressed air maintenance unit, which has several maintenance modules in a row one after the other, wherein the control module arrangement has a bus interface for communicating with the maintenance modules via an internal bus of the maintenance unit. The control module arrangement has a diagnostic device for communicating with an input/output device of the maintenance unit, wherein the input/output device has a connector for connecting at least one diagnostic sensor separate from the maintenance unit and/or at least one pneumatic compressed air influencing actuator separate from the maintenance unit, wherein the control module arrangement can control the one or more compressed air influencing actuators via the input/output device and/or can receive diagnostic messages from the one or more separate diagnostic sensors.

20 Claims, 3 Drawing Sheets

CONTROL MODULE ARRANGEMENT AND COMPRESSED AIR MAINTENANCE UNIT

FIELD OF THE INVENTION

The invention relates to a control module arrangement for a compressed air maintenance unit, which is constructed like a battery and which has several maintenance modules in a row one next to the other, such as, e.g., pressure regulators, filters, oilers, or the like, wherein the control module arrangement has a bus communications means for communicating with the maintenance modules via an internal bus of the maintenance unit. The invention further relates to a compressed air maintenance unit with several maintenance modules in a row one next to the other and such a control module arrangement.

BACKGROUND OF THE INVENTION

Such a control module arrangement or compressed air maintenance unit is known, for example, from EP 1 400 702 A2. In the known compressed air maintenance unit, there is an internal bus through which maintenance modules or a control module for controlling the compressed air maintenance unit as well as other valve modules of the maintenance unit communicate. Input/output modules, SPS modules, or the like can also be connected to the bus system. The known control module arrangement is used for local diagnosis of the maintenance unit or the valve modules, which are added to the maintenance modules like a battery. Parts of the maintenance modules and/or the valves of the valve arrangement have sensors or diagnostic means, especially pressure sensors, whose sensor signals are transmitted via the internal bus to the control module. The control module has a field bus interface, by means of which an access to diagnostics on the part of an external control center is possible, which is used for controlling and monitoring the compressed air maintenance unit as well as the valves connected to this unit.

However, the diagnostic capabilities of the known compressed air maintenance unit are limited to the compressed air maintenance unit itself.

SUMMARY OF THE INVENTION

Therefore, the problem of the present invention is to expand the diagnostic functionality of the control module arrangement or the compressed air maintenance unit explained in the introduction.

To solve the problem, in a control module arrangement of the type named above, the invention provides that it has a diagnostic means for communicating with an input/output device of the maintenance unit, wherein the input/output device has a connection means for connecting one or more of the diagnostic sensors separate from the maintenance unit and/or one or more pneumatic compressed air influencing actuators separate from the maintenance unit, wherein the control module arrangement can control, via the input/output device, the one or more compressed air influencing actuators and/or which can receive diagnostic messages from the one or more separate diagnostic sensors; and that the diagnostic means are configured for generating diagnostic data for a higher-order diagnostic device for diagnosing at least one function of the compressed air maintenance unit with reference to diagnostic messages of the one or more separate diagnostic sensors and/or the maintenance modules, so that the compressed air maintenance unit forms a diagnostic node. The compressed air maintenance unit according to the invention is equipped with such a control module arrangement.

The control module arrangement or the compressed air maintenance unit according to the invention can be constructed into a diagnostic node by connecting additional external diagnostic sensors or diagnostic actuators. The diagnostic functions are no longer limited to the board-specific sensors or actuators of the compressed air maintenance unit. Instead, additional diagnostic sensors or compressed air influencing actuators separate from the compressed air maintenance unit can be connected to the compressed air maintenance unit. Such sensors are, for example, flow rate sensors, moisture sensors, particle sensors, pressure sensors, position sensors, or the like. The one or more compressed air influencing actuators can be, for example, actuators for influencing the pressure and/or flow of the compressed air, e.g., a pneumatic valve, a pneumatic regulator, or the like.

The external diagnostic sensors or compressed air influencing actuators are preferably allocated to one component, which is supplied with compressed air by the maintenance unit. Such a component is, for example, another lower-level maintenance unit, a valve battery, or the like. The diagnostic sensors or compressed air influencing actuators preferably form one part of the component.

The control module arrangement preferably has a control means for controlling the maintenance modules and/or the compressed air influencing actuators, which evaluate the diagnostic messages of the separate diagnostic sensors and/or the maintenance modules. It is also possible for the control means to evaluate the diagnostic data for controlling the maintenance modules or the compressed air influencing actuators, which are formed with reference to the diagnostic messages.

The input/output device can communicate with the diagnostic means via a proprietary connection or via the internal bus. Especially preferred is for the input/output device to be configured as a module of the compressed air maintenance unit, an input/output module, so to speak. However, it is also possible for the input/output device to be a component of the control module arrangement according to the invention.

In the formation of the diagnostic data, the diagnostic means perform the following preferred measures. For example, they link diagnostic messages with reference to one or more logic conditions. The term linking is understood to mean, for example, the formation of relationships, for example, forming the ratio of two or more pressure measurement values, a ratio between a compressed measurement value and a flow rate measurement value, or the like. A logic condition can also be, for example, that when a limiting value is exceeded, measurement values, e.g., pressure measurement values, are transmitted at a higher or lower transmission frequency.

Data reduction is also advantageous in the formation of the diagnostic data. For example, the diagnostic means do not transmit every diagnostic message, but instead maximum values, minimum values, the exceeding of threshold values, or the like within the framework of the diagnostic data.

The diagnostic data advantageously have a format that is viewable through an Internet browser. They are written, e.g., in a page description language.

It is useful if the connection means of the input/output device are configured for connecting a fluid hose to at least one especially electric signal conductor for connecting to at least one diagnostic sensor or the compressed air influencing actuator. In this way, an especially simple connection is possible both in terms of fluids and also in terms of electricity. It is understood that the hose can also contain an optical fiber, to which the connection means can be connected.

Advantageously, the control module arrangement according to the invention is equipped with a control means, e.g., a memory programmable control, for controlling the maintenance modules and optionally also other modules, for example, valve modules.

For communicating with a higher-order control device or the higher-order diagnostic device, it is useful if there are first and second communications means that are separate from each other. It is useful if the first communication means is used for connecting to a kind of control bus and/or control network, which is also used for controlling and monitoring other components, for example, valve batteries, pressure maintenance units, or the like. The second communications means is used for connecting to a diagnostic bus or to a diagnostic network. So-called central diagnostics of the lower-level, connected devices, for example, of the compressed air maintenance unit according to the invention, are performed at the higher-order diagnostics device. The diagnostics device enables, for example, a graphic display of the compressed air maintenance unit, the graphic display of consumption curves, of measurement value-time diagrams, operand values, e.g., parameters, connection assignments, etc., or other diagnostic data.

The control module arrangement preferably operates the first communications means before the second communications means in order of priority. The first communications means are, for example, real-time capable, while the second communications means feature a greater transmission bandwidth than the first communications means. In this way, the controllability by means of the first communications means is guaranteed. For example, the control module arrangement transmits fewer diagnostic messages via the first communications means than via the second communications means. For example, system critical diagnostic messages are output by the first communications means. So-called "normal" messages, for example, cyclical measurement values or the like, are also transmitted through the second communications means. Furthermore, e.g., downloading and/or uploading of parameters and/or test programs and/or other software is preferably performed on the second communications means.

It is useful if the parameters for transmitting diagnostic data with the first and/or the second communications means can be set. Preferably, first transmission parameters can be set for the first communications means and second transmission parameters can be set for the second communications means in the appropriate first and second communications means. However, it is also possible for the appropriate transmission parameters for diagnostic data to be set at the first, i.e. the control communications means for both the first and also the second communications means.

It is useful if the control module arrangement can be controlled essentially via the first communications means. The second communications means advantageously includes a receiving block for preset control commands for controlling the compressed air maintenance unit. Thus, it is prevented that control commands are received at the second communications means provided for diagnostic purposes and are evaluated by the control module arrangement.

The first or second communications means advantageously have a bus interface, for example, a field bus interface, an Ethernet interface, or the like. Especially in the second diagnostic communications means, wireless communication, e.g., via wireless LAN, Bluetooth, or the like, is preferred.

It is useful if the control module arrangement is implemented using a modular design, in which a control module contains control means for controlling the maintenance modules and a diagnostic module contains the diagnostic means.

It is understood that a combination solution is also possible, in which the control means and diagnostic means are unified in one module. In the modular solution, it is useful if the control module and the diagnostic module communicate via the internal bus of the compressed air maintenance unit. Advantageously, the first communications means provided for control purposes are allocated to the control module and the second communications equipped for diagnostic purposes are allocated to the diagnostic module.

Furthermore, it is advantageous to provide a control device interface, by means of which the control module arrangement or the compressed air maintenance unit can be operated and/or parameterized locally. Advantageously, a local visualization device, for example, for displaying diagnostic data or the like, can also be connected to the control device interface.

Embodiments of the invention are explained below with reference to the drawings.

DETAILED DESCRIPTION OF THE PREFERRED EMBODIMENTS

Figure 1:
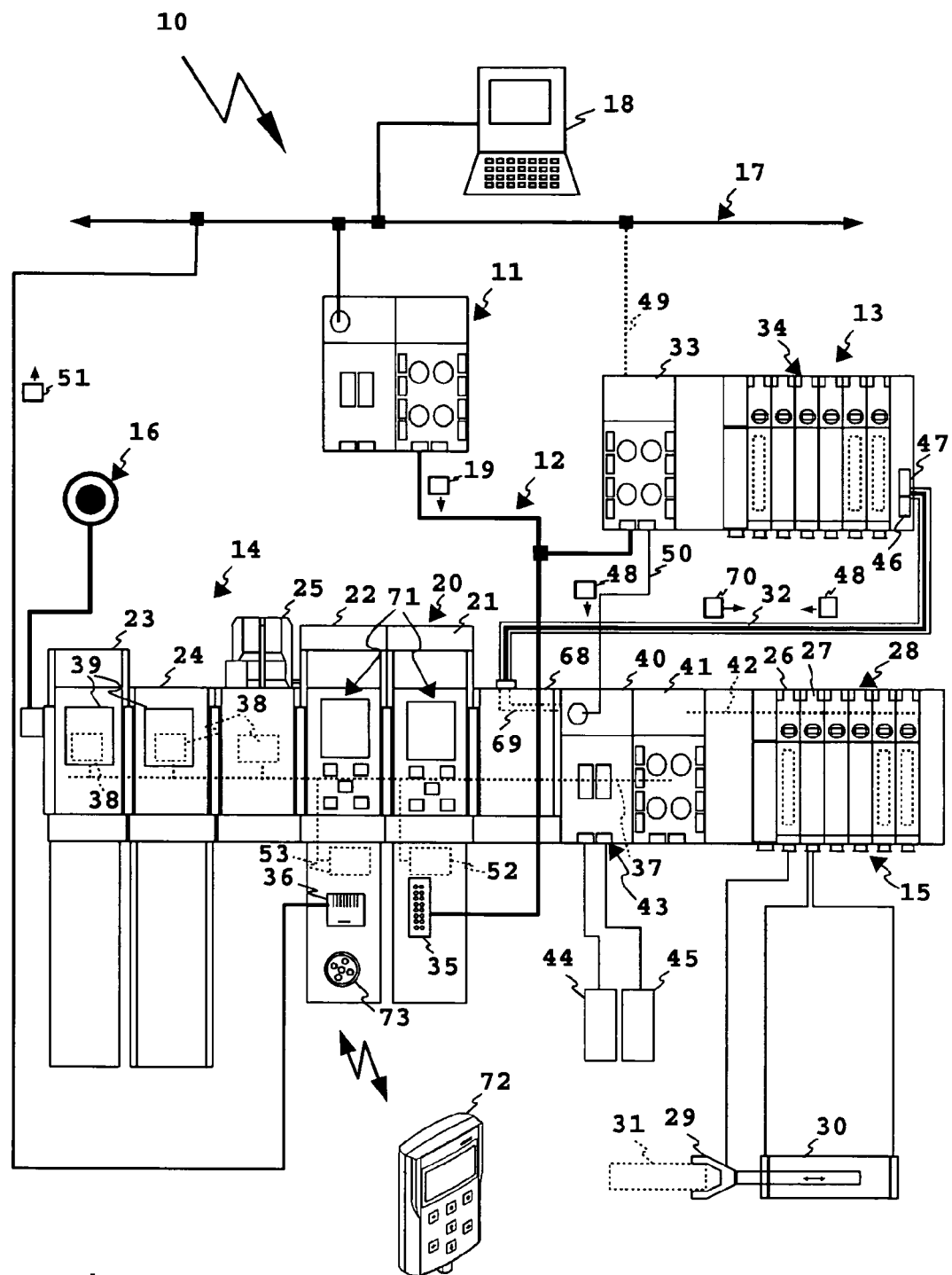
FIG. 1, a pneumatic system with a compressed air maintenance unit according to the invention, which contains a control module arrangement according to the invention and which is integrated into a diagnostic network and a control network, FIG. 2, a schematic view of the control module arrangement according to FIG. 1, FIG. 3, a compressed air hose with signal conductors for connecting to the compressed air maintenance unit according to FIG. 1, and FIG. 4, another pneumatic system, in which compressed air maintenance units according to the invention are integrated.

In a pneumatic system 10 according to FIG. 1, a control device 11 controls a valve battery 13, a compressed air maintenance unit 14, as well as possibly other, not-shown pneumatic functional units, via a control network 12. The compressed air maintenance unit 14 supplies the valve battery 13, as well as a valve battery 15, which forms a component of the compressed air maintenance unit 14, with compressed air from a compressed air source 16, which prepares, for example, filters, oils, or the like the compressed air maintenance unit 14.

The control device 11 is, for example, a memory programmable control, which transmits control commands 19 to the compressed air maintenance unit 14 or to its valve battery 15, as well as to the valve battery 13.

In the compressed air maintenance unit 14, a control module arrangement 20 evaluates the control commands 19 with a control module 21 and a diagnostic module 22 for controlling maintenance modules 23, 24, 25, as well as valve modules 26, 27, and other valve modules 28 of the valve battery 15. The maintenance modules 23, 24, 25 contain, for example, a start-up valve module, a filter module, a pressure regulator module, an oiler module, or the like. The valve modules 26, 27, 28 are used for controlling pneumatic actuators, for example, a gripper 29 and a pneumatic actuator 30, e.g., a linear drive, for example, for gripping and manipulating an object 31. The valve modules 26, 27 apply prepared compressed air to the actuator 30 or the gripper 29 through the maintenance modules 23 to 25 in order to activate these devices.

The maintenance unit 14 supplies the valve battery 13 with prepared compressed air via a compressed air line 32. In the valve battery 13, a local control device 33 controls valve modules 34 with reference to the control commands 19. The valve modules 34 act on not-shown pneumatic actuators with compressed air from the compressed air line 32.

The control module arrangement 20 or the maintenance unit 14 forms a diagnostic node within the diagnostic network 17, e.g., an Ethernet, Profinet, Modbus TCP network or the like. Another advantageous property is that first and second communications means 35, 36 are provided in the compressed air maintenance unit 14 or the control module arrangement 20, so that separate communications means are provided for control purposes and diagnostic purposes. In the control module arrangement 20, the division of diagnostics and control tasks is also improved in that there are separate modules dedicated for control tasks and diagnostic tasks, namely the control module 21 and the diagnostic module 22. The control module 21 is not burdened with diagnostic tasks. Nevertheless, it is advantageous for the control module 21 to report predetermined, especially system critical diagnostic messages via the control network 12, for example limiting value exceeding messages, alarm messages, or the like.

The modules of the maintenance unit 14 comprising, that is, for example, the control module arrangement 20 and the maintenance modules 23, 24, 25, communicate via an internal bus 37 of the maintenance unit 24. The bus 37 can be a proprietary bus. However, it is also possible for the bus 37 to be constructed as a field bus, an Ethernet bus, or the like. By means of the bus 37, the modules of the maintenance unit 14 can transmit and receive messages or control commands, wherein, for example, the diagnostic module 22 receives diagnostic messages from the maintenance modules 23, 24, 25 and the control module 21 transmits control commands to the maintenance modules 23, 24, 25, for example, start-up commands, dosing commands for an amount of oil to be dosed, or the like. The maintenance modules 23, 24, 25 include, for example, the controller 38 for communicating with the bus 37 as well as for control tasks. Some parts of the maintenance modules 23 to 25 have input/output means 39, for example, operating buttons, lamp displays, or the like.

Furthermore, input/output modules 40, 41 are connected to the internal bus 37. The control module 41 [sic; 21] can transmit control commands to the valve modules 26 to 28 via the input/output module 41. The input/output module 41 outputs these commands on a bus 42 to the valve modules 26 to 28. Furthermore, the input/output module 41 can receive messages from the valve modules 26 to 28 on the bus 42 and can transmit to the control module 21 or to the diagnostic module 22. These messages can be, for example, interrupt messages, switching state messages, or the like. It is understood that variants are possible, in which the valve modules 26 to 28 are direct bus subscribers on the bus 37.

The input/output module 40 is allocated to the diagnostic module 22. The input/output module 40 forms an input/output device with connection means 43 for connecting diagnostic sensors, for example sensors 44, 45, 46, which are separate from the maintenance unit 14. Furthermore, compressed air influencing actuators, e.g., a switching valve 47 [or the like], which are separate from the maintenance unit, can be connected to the connection means 43, which contain, for example, corresponding electrical and/or optical contacts. The diagnostic sensors 44 are, for example, temperature sensors, pressure sensors, particle sensors, or the like, which are arranged on components, for example, the actuator 30 and the valve battery 13, separate from the maintenance unit 14. The diagnostic sensor 46 monitors, for example, the pressure in the connection region of the compressed air line 32 to the valve battery 13 and transmits, for example, messages on the pressure, temperature, particle content, or the like, in the region of the valve battery 13, as diagnostic messages 48.

In principle, it would certainly be possible for the control module 33 of the valve battery 13 to output diagnostic messages via a connection 49 on the diagnostic network 17. However, the issue is that the maintenance unit or the control module arrangement 20 forms a diagnostic node within the diagnostic network 17, to which the valve battery 13 or its control module 33 transmits diagnostic messages 48 via a connection 50. The connection 50 likewise leads to the input/output module 40. It is possible for both connections 49, 50 to be provided, wherein the valve battery 13 outputs diagnostic messages in part directly via the connection 49 on the diagnostic network 17 and in part, e.g., as far as they concern the compressed air preparation and contain, for example, pressure measurement values, humidity measurement values, or the like, on the connection 50, so that the diagnostic module 22 can evaluate these diagnostic messages 48 for forming diagnostic data 51.

Figure 2:
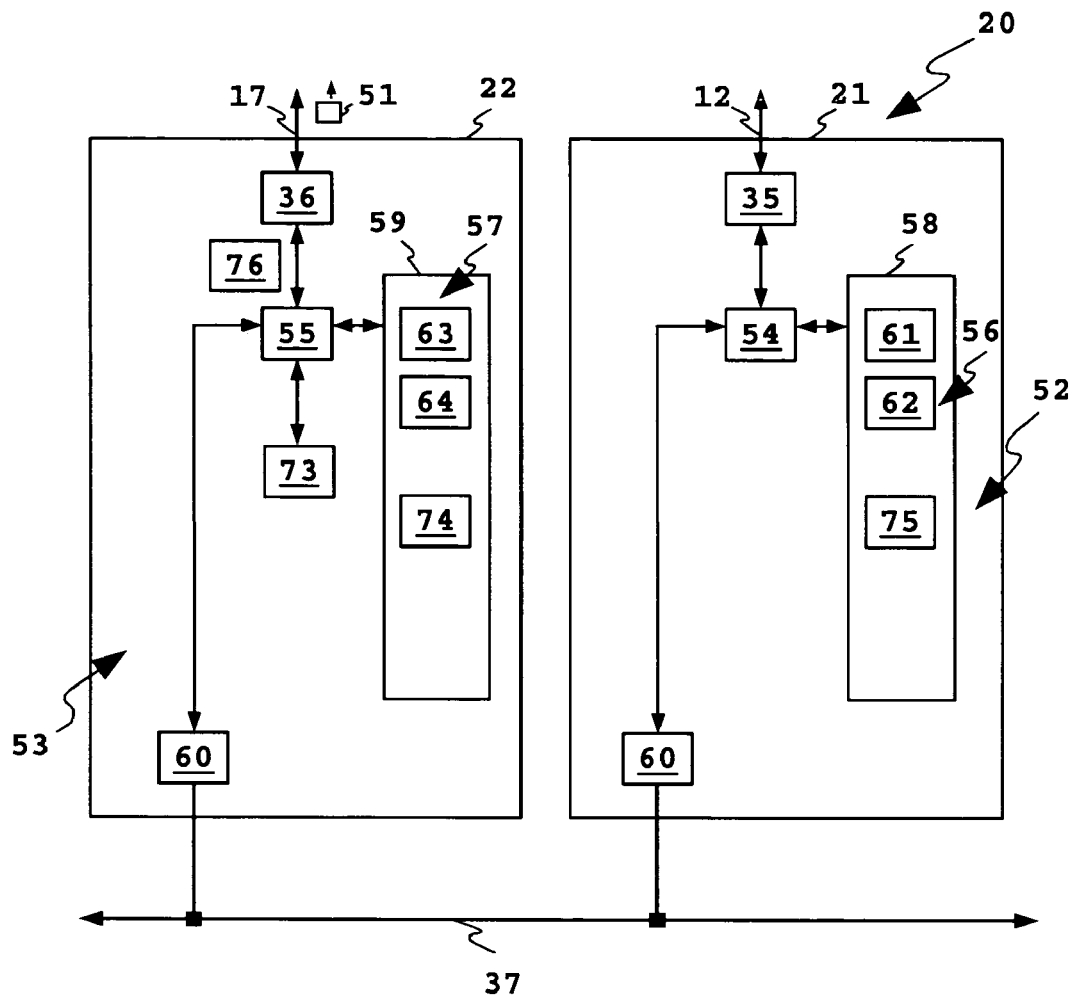
Figure 3:
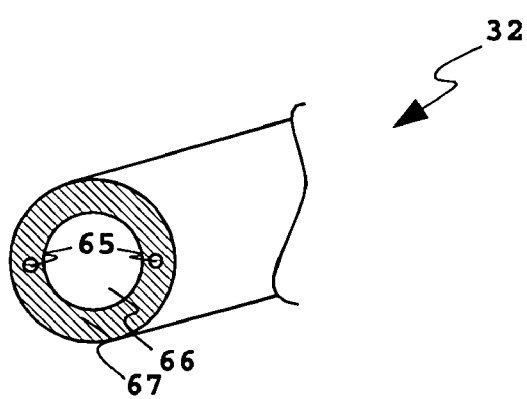

The functions of control means 52 of the control module 21 for controlling the maintenance unit 14 and the functions of diagnostic means 53 of the diagnostic module 22 are explained below with reference to FIG. 2.

The control means 52 and the diagnostic means each contain a processor 54, 55 for executing program code by program modules 56, 57, which are stored in memory means 58, 59. The memory means 58, 59 contain, for example, volatile and/or non-volatile memory. The program code of the program modules 56, 57 contains instructions for realizing the control functions and diagnostic functions of the control module 21 or the diagnostic module 22. The processors 54, 55 are connected to the memory means 58, 59 as well as to the communication means of the control module 21 or the diagnostic module 22 via internal connections, which are indicated schematically by arrows. For example, the modules 21, 22 contain the bus controller 60 as bus communications means for communicating on the internal bus 37. Furthermore, the processors 54, 55 communicate with the help of the communications means 35, 36 with the control network 12 and the diagnostic network 17. The communications means 35 contain, for example, a field bus controller for the control network 12, which preferably can be a field bus network, for example, a CAN, ASi network, Profibus, Interbus, Devicenet, or the like (CAN=Controller Area Network, ASi=Actuator-Sensor Interface).

The second communications means 36 preferably contains an Ethernet controller, a W-LAN controller (=Wireless LAN) or the like for the diagnostic network 17, which preferably has a greater transmission bandwidth than the control network 12. In contrast, the control network 12 is preferably real-time capable and thus designed optimally for control tasks.

In the control module arrangement 20, separate processors 54, 55 are provided for the control tasks and diagnostic tasks. It is understood that other processors can also be provided. However, a construction with only one single processor is also possible. Particularly in this variant, it is preferred for this single processor to fulfill the control tasks before the diagnostic tasks in order of priority, for example, to operate the first communications means 35 for the control network 12 before the second communications means 36 for the diagnostic network 17 in order of priority.

The program modules 56 of the control module 21 contain, for example, an SPS module (SPS=memory programmable control) for controlling the maintenance modules 23 to 25 and/or the valve modules 26, 27, 28. Furthermore, there is a diagnostic program module 62, which outputs, in particular, system critical diagnostic messages on the control network 12, for example, when a filter is contaminated up to a critical limit, an additive for the compressed air to be prepared has been nearly used up, a fault has occurred in one of the maintenance modules 23, 24, 25 or the valve modules 26, 27, 28, or the like. Such system critical diagnostic messages would negatively affect the functionality of the maintenance unit 14 and thus the performance of control commands 19 by the control device 11 becomes worse, if not totally impossible.

The diagnostic module 22, whose program modules 57 likewise have a diagnostic program module 63, provide significantly more extensive diagnostic functions than the control module 21. The diagnostic program module 63 processes the diagnostic messages 48 and generates from these messages diagnostic data 51, which it outputs on the diagnostic network 17. The diagnostic data 51 contain, for example, at regular time intervals, a filling state of an additive, which is added by one of the maintenance modules 23, 24, or 25 to the compressed air from the compressed air source 16, a difference pressure value between pressures at the input and at the output of the maintenance module 24 constructed as a filter, or the like. From such a difference pressure, for example, the degree of contamination of the filter of the maintenance module 24 can be determined. Furthermore, the diagnostic data 51 can contain, for example, periodic particle values of particles contained in the compressed air, moisture values, or the like.

Furthermore, the program modules 57 of the diagnostic module 22 contain a visualization module 64 for the output of visualization data within the framework of the diagnostic data 51. This visualization data, which can be output, e.g., to the diagnostic device 18, contain, for example, a graphical image of the maintenance unit 14 and/or its modules, measurement value time diagrams, operand values, e.g., parameters, connection assignments, etc., or other diagnostic data. Thus, e.g., an image of the maintenance unit is available on the diagnostic device 18. For example, the individual maintenance modules 23, 24, 25 can be shown graphically as a function of their corresponding operating state (for example defective/not defective) in the visualization data.

Especially preferred is self-configuration of the maintenance unit 14, in which the modules of the maintenance unit 14 are defined automatically, so to speak, by the control module arrangement 20. For example, the maintenance modules 23, 24, 25 transmit identifiers and/or at least part of their technical data via the internal bus 37 to the control module arrangement 20. For example, with reference to these identifiers or technical data, the diagnostic module 22 is in the position to graphically represent the maintenance modules 23 to 25 on the diagnostic device 18.

The diagnostic program module 63 can link diagnostic messages 48 to each other and thus can form so-called linked diagnostic data 51. Here, the diagnostic program module forms, for example, relationships between pressure values, which are determined by the maintenance modules 23, 24, and 25. In the same way, relationships of flow rate measurement values, for example, for determining a consumption measurement value of the valve batteries 13 and 15, can also be formed. The diagnostic data 51 can further contain maximum values and/or minimum values, for example, for determining a maximum compressed air requirement or the like. Furthermore, the diagnostic program module 63 can perform data reduction and can output predetermined messages of the diagnostic messages 48 only at predetermined time intervals, for example, every minute, every second, or the like, within the framework of the diagnostic data 51 on the diagnostic network 17. The diagnostic program module 63 can also form average values.

Furthermore, it is possible for the diagnostic program module 63 to monitor, so to speak, the data traffic between the modules of the maintenance unit 14 and to generate diagnostic data 51 from this data traffic. Here, linking of these diagnostic messages is useful, in which the diagnostic program module 63 forms quotients, for example, from pressure measurement values, which determine the maintenance modules 23, 25.

The diagnostic data 51, especially the visualization data generated by the visualization module 64, preferably have a format that can be viewed by means of an Internet browser, for example, a format such as HTML (HTML=Hypertext Markup Language).

The control module arrangement 20 controls the compressed air influencing actuators 47 in the form of a switching valve, proportional valve, or the like, separate from the maintenance unit 14 as a function of the diagnostic messages 48. If the diagnostic sensor 46 reports, for example, too high or too low a pressure with the diagnostic messages 48, then the diagnostic program module 63 switches the valve 47 to resolve this problem, for example, opening the valve 47 further or closing it. It is also possible for the SPS module 61 of the control module 21 to activate the switching valve 47 as a function of the diagnostic messages 48 of the sensor 46.

The compressed air line 32 contains a compressed air channel 66, which is defined by a wall 67. Optical or electrical signal lines 65 for communicating with diagnostic sensors and/or pressure influencing valves, which are separate from the maintenance unit 14 and which comprise the diagnostic sensor 46 and the switching valve 47, run in the wall 67. Thus, it is not necessary to install additional signal connections for diagnostic purposes between the maintenance unit 14 and the valve battery for diagnostic tasks. The compressed air line 32 is connected to a connection module 68 of the maintenance unit 14. The connection module 68 is connected by means of connection lines 69 to the input/output module 40, so that the input/output module 40 can receive the diagnostic messages 48 of the sensor 46 and can output control commands 70 for controlling the actuator 47. A variant, in which the connection module 68 has, for example a bus controller or some other communications means for communications on the internal bus 37, would also be possible in order to communicate with the control module arrangement 20.

The control module arrangement 20 comprising the control module 21 and also the diagnostic module 22 has input/output means 71, e.g., on its front side. The control module arrangement 20 can visualize functions of the maintenance unit 14 or receive local operating commands by means of the input/output means 71, which contain, for example, push buttons, a display, or the like.

Furthermore, local operation, parameterization, visualization, or the like is possible with the help of an operating device 72, which can be connected by wires or preferably by a wireless method to an operating device interface 73. For example, the diagnostic program module 63 can output the diagnostic data 51 to the interface 63 completely or partially. A wired variant of the operating device interface 73 preferably has a high class of electrical protection and/or data transmission methods suitable for industry. The operating device 72 preferably is an MMI (Man Machine Interface) suitable for industrial environments, for example, a personal computer, a notebook, a personal digital assistant (PDA), or the like.

Preferably, the control module arrangement 20 can be parameterized, wherein extent, quality, or other properties of the diagnostic data 51 can be set by means of parameters 74. For example, the diagnostic device 18 transmits the parameters 74 to the diagnostic module 22 via the diagnostic network 17. The parameters 74 contain, for example, threshold values, transmission intervals between measurement values to be transmitted, turn-on/turn-off commands for transmitting measurement values or the like. It is also possible for program parts, for example, for calculating quotients, for generating graphical visualization data, or the like, to be transmitted from the diagnostic device 18 to the diagnostic module 22. In a corresponding way, the diagnostic program module 62 of the control module 21 can be parameterized by means of parameters 75. For example, the control device 11 transmits the transmission parameters 75 to the control module 21.

In particular, if the control module arrangement 20 contains only a single module containing both the diagnostic means and also the control means 52, 53, then it is preferred for a blocking device 76 to block the reception of predetermined control commands at the second communications means 36, for example, for controlling the valve modules 26, 27, 28.

Figure 4:
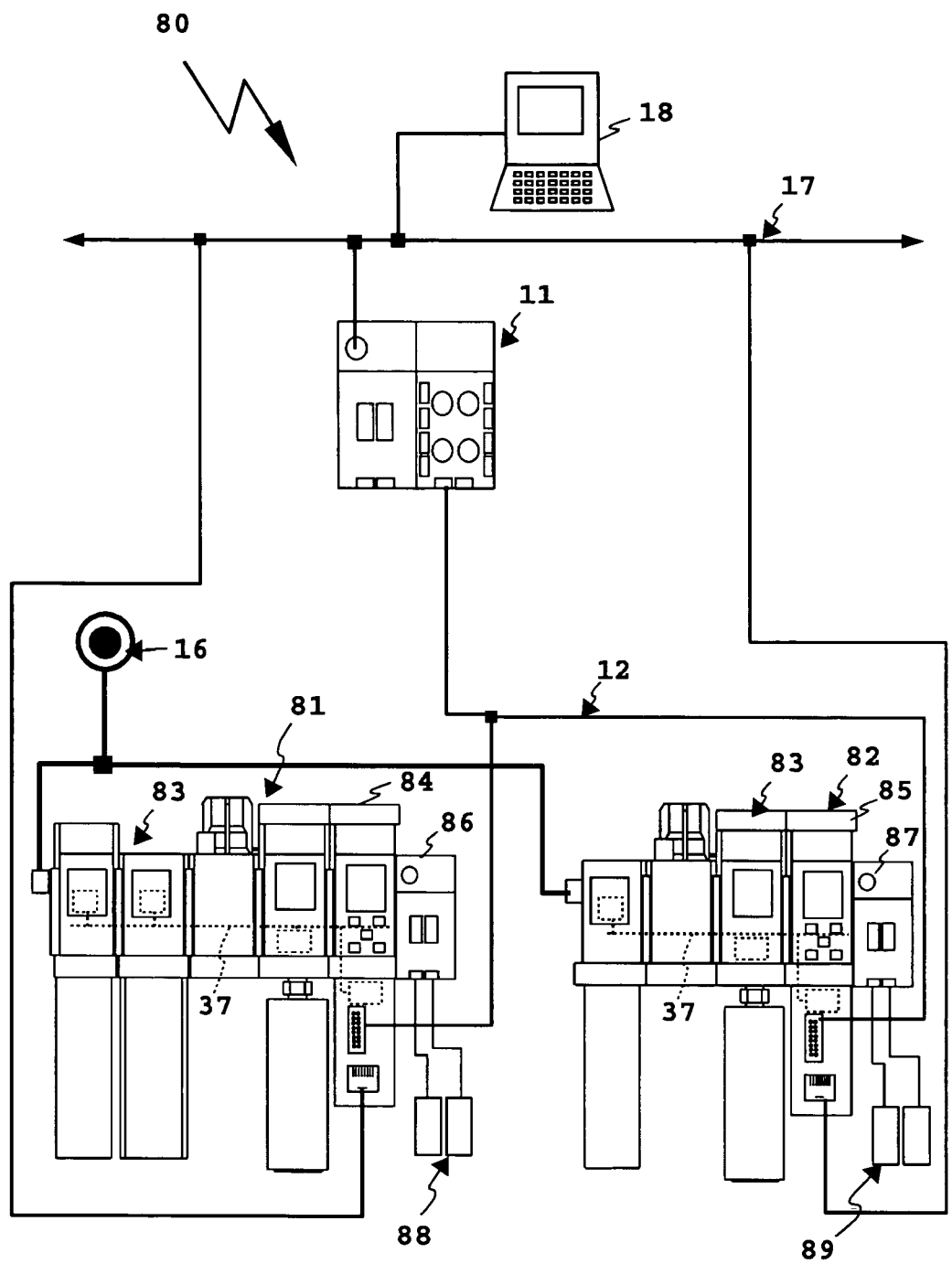

With reference to FIG. 4, additional variants of the maintenance units according to the invention are presented below. In so far as modules or components are shown in FIG. 4, the modules exhibiting the same functions as corresponding modules from FIG. 1 use the same reference symbols. Therefore, a more detailed explanation is not given.

In a pneumatic system 80 according to FIG. 4, the control device 11 controls compressed air maintenance units 81, 82, which prepare, for example, filter, dry, oil, or influence the pressure of the compressed air from the compressed air source 16, by means of the control network 12, which contains, for example, a field bus. For this purpose, the maintenance units 81, 82 contain maintenance modules 83, which are arranged in a row like the maintenance modules 23 to 25 and which communicate with each other by means of an internal bus 37. For controlling and diagnosing the maintenance units 81, 82, control modules 84, 85 are provided, which fulfill both maintenance tasks and also diagnostic tasks in the control module arrangement 20 combined into one component. Correspondingly, the control modules 84, 85 are both connected to the control network 12 via the first communications means and also to the diagnostic network 17 via the second communications means, which are provided in each of the control modules 84, 85. Furthermore, each of the control modules 84, 85 can be used as a diagnostic node. For this purpose, there are input/output modules 86, 87, with which the control modules 84, 85 each communicate via the internal bus 37. Diagnostic sensors 88, 89 are respectively connected to input/output modules 86, 87. The control modules or diagnostic modules 84, 85 can receive diagnostic messages from the diagnostic sensors 88, 89 via the input/output modules 86, 87. The sensors 88, 89 are, for example, compressed air sensors or the like.

The invention claimed is:

1. A control module arrangement for a compressed air maintenance unit, the control module arrangement being adapted to be assembled in stacked arrangement with several maintenance modules of the maintenance unit in a row one after the other, wherein the control module arrangement has a bus communications means for communicating with the maintenance modules via an internal bus of the maintenance unit, wherein the control module arrangement further comprises a diagnostic means for communicating with an input/output device of the maintenance unit, wherein the input/output device has a connection means for connecting at least one diagnostic sensor separate from the maintenance unit and/or for connecting at least one pneumatic compressed air influencing actuator separate from the maintenance unit, wherein the control module arrangement can control the one or more compressed air influencing actuators via the input/output device and/or the control module arrangement can receive diagnostic messages from the one or more separate diagnostic sensors, and wherein the diagnostic means are constructed for generating diagnostic data for a higher-order diagnostic device for diagnosing at least one function of the compressed air maintenance unit with reference to diagnostic messages of the one or more separate diagnostic sensors and/or with reference to diagnostic messages of the maintenance modules, so that the compressed air maintenance unit forms a diagnostic node, and wherein the control module arrangement further comprises first communications means for communicating with a higher-order control device for controlling and/or monitoring the compressed air maintenance unit and second communications means for communicating with the higher-order diagnostic device, to which the diagnostic data can be output, wherein the arrangement operates the first communications means before the second communications means in order of priority.

2. A control module arrangement according to claim 1, wherein the one or more separate diagnostic sensors and/or the one or more compressed air influencing actuators are allocated to a separate component, supplied with compressed air from the maintenance unit.

3. A control module arrangement according to claim 1, wherein the control module is constructed for controlling the maintenance modules and/or the one or more compressed air influencing actuators separated from the maintenance unit with reference to the diagnostic messages of the one or more separate diagnostic sensors and/or the maintenance modules.

4. A control module arrangement according to claim 1, wherein the one or more compressed air influencing actuators comprises a pneumatic valve and/or a pneumatic regulator.

5. A control module arrangement according to claim 1, wherein the one or more sensors comprises a magnetic sensor and/or an optical sensor and/or a pressure sensor and/or a temperature sensor and/or a flow rate measurement device and/or an electric measurement contact probe.

6. A control module arrangement according to claim 1, wherein the diagnostic means communicate with the input/output device via a proprietary connection and/or via the internal bus.

7. A control module arrangement according to claim 1, wherein the input/output device is constructed as a module of the compressed air maintenance unit.

8. A control module arrangement according to claim 1, wherein the diagnostic means link diagnostic messages of the one or more separate diagnostic sensors and/or the maintenance modules with reference to at least one logic condition to the diagnostic data.

9. A control module arrangement according to claim 1, wherein the diagnostic means perform data reduction for the formation of the diagnostic data.

10. A control module arrangement according to claim 1, wherein the diagnostic data have a format that can be viewed through an Internet browser.

11. A control module arrangement according to claim 1, wherein the connection means of the input/output device are constructed for connecting a fluid hose to at least one electrical or optical conductor to the one or more diagnostic sensors and/or to the one or more compressed air influencing actuators.

12. A control module arrangement according to claim 1, further comprising control means, especially a memory programmable control for controlling the maintenance modules.

13. A control module arrangement according to claim 1, wherein the first communications means are real-time capable.

14. A control module arrangement according to claim 1, wherein the second communications means have a reception block for predetermined control commands for controlling the compressed air maintenance unit.

15. A control module arrangement according to claim 1, wherein the first and/or the second communications means have a bus interface.

16. A control module arrangement according to claim 1, wherein the arrangement can be set by its transmission parameters for transmitting diagnostic data.

17. A control module arrangement according to claim 1, further comprising a control module, which contains the control means for controlling the maintenance modules, and a diagnostic module, which contains the diagnostic means.

18. A control module arrangement according to claim 1, further comprising an operating device interface for connecting a local operating device and/or visualization device.

19. A control module arrangement for a compressed air maintenance unit, the control module arrangement being adapted to be assembled in stacked arrangement with several maintenance modules of the maintenance unit in a row one after the other, wherein the control module arrangement has a bus communications means for communicating with the maintenance modules via an internal bus of the maintenance unit, wherein the control module arrangement further comprises a diagnostic means for communicating with an input/output device of the maintenance unit, wherein the input/output device has a connection means for connecting at least one diagnostic sensor separate from the maintenance unit and/or for connecting at least one pneumatic compressed air influencing actuator separate from the maintenance unit, wherein the control module arrangement can control the one or more compressed air influencing actuators via the input/output device and/or the control module arrangement can receive diagnostic messages from the one or more separate diagnostic sensors, and wherein the diagnostic means are constructed for generating diagnostic data for a higher-order diagnostic device for diagnosing at least one function of the compressed air maintenance unit with reference to diagnostic messages of the one or more separate diagnostic sensors and/or with reference to diagnostic messages of the maintenance modules, so that the compressed air maintenance unit forms a diagnostic node, and wherein the control module arrangement further comprises first communications means for communicating with a higher-order control device for controlling and/or monitoring the compressed air maintenance unit and second communications means for communicating with the higher-order diagnostic device, to which the diagnostic data can be output, wherein the arrangement transmits fewer diagnostic messages via the first communications means than via the second communications means.

20. A control module arrangement for a compressed air maintenance unit, the control module arrangement being adapted to be assembled in stacked arrangement with several maintenance modules of the maintenance unit in a row one after the other, wherein the control module arrangement has a bus communications means for communicating with the maintenance modules via an internal bus of the maintenance unit, wherein the control module arrangement further comprises a diagnostic means for communicating with an input/output device of the maintenance unit, wherein the input/output device has a connection means for connecting at least one diagnostic sensor separate from the maintenance unit and/or for connecting at least one pneumatic compressed air influencing actuator separate from the maintenance unit, wherein the control module arrangement can control the one or more compressed air influencing actuators via the input/output device and/or the control module arrangement can receive diagnostic messages from the one or more separate diagnostic sensors, and wherein the diagnostic means are constructed for generating diagnostic data for a higher-order diagnostic device for diagnosing at least one function of the compressed air maintenance unit with reference to diagnostic messages of the one or more separate diagnostic sensors and/or with reference to diagnostic messages of the maintenance modules, so that the compressed air maintenance unit forms a diagnostic node, and wherein the control module arrangement further comprises first communications means for communicating with a higher-order control device for controlling and/or monitoring the compressed air maintenance unit and second communications means for communicating with the higher-order diagnostic device, to which the diagnostic data can be output, wherein the second communications means have a greater transmission bandwidth than the first communications means.

* * * * *